June 5, 1951 — D. V. STELLIN — 2,556,155
SOCKET HEAD SCREW
Filed July 13, 1946
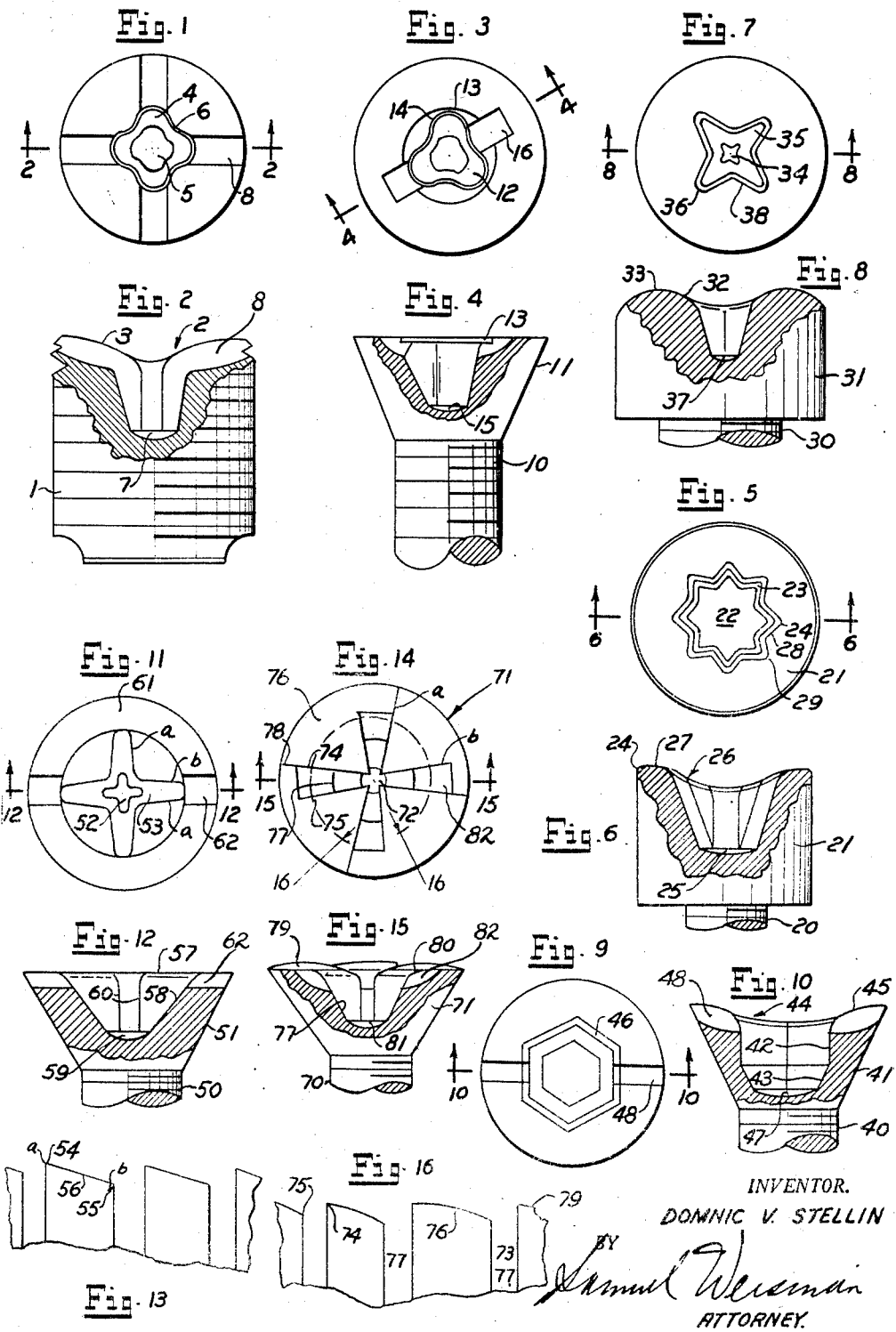
INVENTOR.
DONNIC V. STELLIN
BY
ATTORNEY.

Patented June 5, 1951

2,556,155

UNITED STATES PATENT OFFICE 2,556,155

SOCKET HEAD SCREW

Domnic V. Stellin, Detroit, Mich.

Application July 13, 1946, Serial No. 683,531

8 Claims. (Cl. 85—45)

The present invention pertains to socket head screws having sockets of novel design and characteristics. The general object of the invention is to provide such sockets that enable the power operated driver applied thereto to have a high wrenching effect. Another object of the invention is to provide a socket so shaped that it readily expels the driver after the screw has been driven tight.

Another important object of the invention is to provide a socket that becomes an easy target for the fast spinning mechanical screw driver. In this connection it is noted that a mechanical driver frequently scrapes considerably on the head of the screw before becoming seated in the socket. If the screw head has previously become moistened from the hands of the operator, by oil or water accidentally thrown thereon in manufacturing routine, the heat of friction frequently causes the screw head to become hard and brittle and a piece thereof broken and thrown off with such force as to injure the operator or nearby workers. Hence it is important that the driver find its target, or seat itself in the socket, with as little scraping as possible.

A depression is formed in the top of the screw head as a target for the driver. In one embodiment the depression has a convex wall on the top of the screw head and extending toward the margin thereof, with the bottom of the depression at the center of the screw and in communication with the socket. In another form, the depression with a generally convex wall consists of a number of sloping surfaces formed at the top of the screw head and positioned in a manner to bring the driver promptly into register with the socket.

In connection with the high wrenching effect mentioned above, it is also an object of the invention to provide a socket of such configuration as to receive a relatively stubby driver or one having stubby vanes or wings that are not likely to break off. With this object in view, the socket consists of a central recess and radial pockets having a substantial circumferential extent in relation to the radial length. In one embodiment, for example, the circumferential extent is substantially equal to the radial extent. Consequently, the driver that fits into such a socket necessarily has strong and relatively short vanes.

Another object of the invention is to overcome the splitting of the screw head, especially of the small sizes of screws. This object is accomplished by the use of a socket, as described, having pockets that are relatively short in the radial direction. By this formation, there is retained around the outer ends of the pockets a substantial quantity of metal that resists splitting under torsion.

Another object of the invention is to enable a screw to hang on the driver, thereby leaving the operator's hands free for other operations, and enabling the screw to enter freely into the hole and follow the thread without stripping. The described shape of the socket permits the screw to hang on the end of the driver.

Still another object of the invention is to enable one size of driver to be used effectively on more than one size of screws. For this purpose, the outer walls of the socket taper or converge toward the screw axis along a uniform slope. The driver is similarly tapered, and the same angle of slope is maintained in various sizes of screws and their sockets, so that they are geometrically similar. Consequently, a driver having the same angle of slope will enter into and fit into various sizes of sockets, but at varying depths, which, however, are adequate for driving in a given series of sizes.

Still another object of the invention is to combine with the socket a diametrical slot in a novel relation thereto and designed to receive a conventional screwdriver in the event that a specially shaped driver for the socket is not available.

A further object of the invention is to provide a socket that will not expel the driver before the screw has been driven tight. This result is accomplished by the aforementioned type of socket, having pockets of relatively short radial extent, together with a correspondingly shaped driver having stubby wings or vanes. Moreover, by reason of this construction, the mechanical driver can be adjusted for greater power and speed without breaking or splitting the screw head around the socket or slot, as the case may be.

The invention is fully disclosed by way of example in the following description and in the accompanying drawings in which:

Figure 1 is a plan view of a set screw according to the invention;

Figure 2 is a section on the line 2—2 of Figure 1;

Figure 3 is a plan view of a wood screw embodying the invention;

Figure 4 is a section on the line 4—4 of Figure 3;

Figure 5 is a plan view of a tap screw, embodying the invention;

Figure 6 is a section on the line 6—6 of Figure 5;

Figure 7 is a plan view of a round head machine screw with a modified form of socket;

Figure 8 is a section on the line 8—8 of Figure 7;

Figure 9 is a plan view of a flat head screw, embodying a modification of the invention;

Figure 10 is a section on the line 10—10 of Figure 9;

Figure 11 is a plan view of a flat head wood screw, with another modification of the invention;

Figure 12 is a section on the line 12—12 of Figure 11;

Figure 13 is a developed section on the line 13—13 of Figure 11;

Figure 14 is a plan view of a flat head machine screw, embodying another modification of the invention;

Figure 15 is a section on the line 15—15 of Figure 14;

Figure 16 is a developed section on the line 16—16 of Figure 14.

Reference to these views will now be made by use of like characters which are employed to designate corresponding parts throughout.

In Figures 1 and 2 is shown a screw 1, such as a set screw, having a recess 2 formed in its top or head. The recess is symmetrical about the axis of the screw and has its deepest portion in the center of the top of the screw. The side walls of the recess or depression 2, extending from the margin of the screw head toward the center of the recess, are of convex formation as indicated by the numeral 3, for a purpose that will presently be described.

The screwdriver socket extends from the center of the recess 2. It comprises a number of lateral or radial pockets 4 extending from a central cavity 5. The upper marginal edge of the socket 4—5 is chamfered slightly at 6 to facilitate entry of the screwdriver therein. The chamfer 6 is on a smaller radius than the convex surface 3.

The bottom of the socket 4—5 is concavely spherical on a large radius and thus substantially truncated as indicated by the numeral 7. The side walls of the pockets 4, while converging radially outward and also towards the screw axis, do not converge toward each other in a plane passed across a pocket and in the lengthwise direction of the screw. In other words, the side walls of any pocket are equidistant along any intersecting or transverse plane parallel to and outside the screw axis.

Finally, the top of the screw is formed with one or more diametrical slots 8 having straight parallel side walls and adapted to receive a conventional screwdriver.

The manner in which the advantages and stated objects of the invention is realized can now be described. The socket furnishes an easy target for the rapidly spinning power driven screwdriver. This is due to the short radial length of the pockets 4 in relation to their circumferential dimension. It is evident that the screwdriver is shaped to fit in the socket. Consequently its wings designed to enter the pockets have the same stubby configuration. A screwdriver of this shape obviously finds its target much more easily than one having relatively thin and elongated wings.

The entrance of the screwdriver into the socket is further facilitated by the depression or recess 2 and its convex wall 3. The importance of such easy entrance is that there is less preliminary scraping of the driver against the top of the screw. Scraping is undesirable since it is liable to damage either the driver or the screw or to break off pieces thereof with such force as to injure the operator or nearby fellow workers.

A screw frequently becomes moistened from the hands of the operator or by water accidentally contacting it or the driver, or it may previously have been soaked in oil. In any of these cases the heat generated by scraping of the driver causes the screw head to become brittle and to break off more readily, with the results already noted.

With reference to the relatively flat or slightly dished bottom 7 of the socket, it is evident that the driver will be similarly formed in a blunt configuration at its tip. Prior screws have been formed with a V-shaped or pyramidal bottom and require a similarly sharpened driver that causes excessive chewing or scraping of the screw before the actual driving begins. A similar principle is observed in avoiding the sharp intersection of the walls of the socket and pockets, so that sharp edges on the driver are correspondingly eliminated or reduced, with the result that there is less cutting of the driver against the screw before the full driving engagement has taken place. In this connection it is to be noted that the aforementioned equidistant relation of opposite walls of the pockets along axial planes does not permit looseness of the driver on initially entering the socket, as is the case when parts of the socket converge downwardly and are wider at the top than the tip of the driver. Finally, a screw can be supported on the driver before being driven into the work without being held by hand or without being magnetized, due to the characteristic shape of the socket and driver as herein set forth.

A modification of the invention is exemplified in Figures 3 and 4 which show a wood screw 10, although the invention as applied thereto is equally applicable to various styles of wood and metal screws. In the conical head 11 is formed a socket of somewhat cloverleaf formation comprising three radially extending pockets 12 communicating with one another at their inner or open ends. In the top of the screw and around the top of the socket is formed a recess or depression 13 in the form of a seat and serving the purpose of the recess 2 in Figures 1 and 2. The upper edge of the pockets is formed with a continuous chamfer 14 that is slightly convex. The bottom 15 of the socket is substantially flat or slightly dished.

The recess 13 aids in bringing the screwdriver to its target in substantially the manner described in connection with Figures 1 and 2. The remaining properties and relations disclosed in Figures 1 and 2 are also present in this embodiment.

A conventional screwdriver slot 16 is formed across the top of the screw and is to be used when a specially shaped driver is not at hand. This slot does not extend through the edges of the head, as in Figures 1 and 2, but rather has its ends disposed between the edge of the head and the edge of the recess 13.

In Figures 5 and 6 is shown a cap screw 20 having a head 21 formed with a socket comprising a central opening 22 surrounded by a series of contiguous V-shaped pockets 23 opening into it. The lateral walls of the pockets are angular to radial planes rather than substantially in such planes as in the preceding modifications. These walls, however, are flat and with little radial extent in order to prevent splitting or breaking of the screw or the correspondingly shaped driver. The length of each angular wall is obviously greater than a radius, and this additional length permits the driver to have strong vanes or driving wings. The vertices 24 of the pockets 23 converge towards a relatively flat or slightly dished bottom 25 but the walls of any given pocket do not converge towards each other along the length of the screw, with the results already noted.

The top of the head 21 is formed with a recess or depression 26 symmetrical around the screw axis and having its greatest depth at the axis. The wall 27 of the recess is slightly convex and extends to the edge of the screw head.

A convex chamfer 28 is formed along the outer edges of the pockets. Finally, the intersections of the walls of the pockets are finished with a very small radius 29 to prevent cracking and breaking.

In Figures 7 and 8 is shown a machine screw 30 of the round head type having a head 31. In the top of the head is formed a recess 32 having a convex wall 33 substantially in the manner of Figures 5 and 6 but shaped at the outer margin to merge tangentially with the side wall of the head 31. From the bottom of the recess 32 at the axis of the screw is formed a socket comprising a central cavity 34 surrounded by a series of pockets 35 less numerous than in Figure 5. The outer vertices of the pockets are slightly rounded at 36 and converge toward the substantially flat or truncated bottom 37. The outer edges of the pockets are chamfered convexly at 38. The relatively deep recess 32 and the smaller number of pockets 35 provide an easy target for a high spinning driver and cause the same to enter the socket quite readily.

In Figures 9 and 10 is shown a machine screw 40 of the round head type and having a conical head 41. The socket comprises an upper portion 42 with side walls parallel to the axis of the screw and a bottom portion 43 with side walls converging downwardly towards the axis somewhat in the manner shown in Figures 1 and 25 of my United States Patent No. 2,397,216 in which, as here, the socket is polygonal with obtuse internal angles. The socket extends downward from the bottom of a recess 44 in the top of the head, and this recess has a convex wall 45 extending to the edge of the head for the purpose already set forth. The upper edge of the socket is chamfered convexly at 46 and the bottom 47 is substantially flat or slightly dished. Also, a screw driver slot 48 is formed across the head and terminates at the edge of the latter. The bottom of the slot slopes generally downward toward the screw axis to provide substantial depth throughout the length of the slot.

Figures 9 and 10 show a different form of recess for leading the driver to the socket. In Figures 11, 12 and 13 is shown a flat head wood screw 50 having a conical head 51, although it will be understood that the invention described in this connection is applicable also to various styles of wood and metal screws.

The socket consists of a central or axial cavity 52 and a series of pockets 53 extending radially therefrom. One wall 54 of each pocket is somewhat higher in the head of the screw than the nearer wall 55 of the nearer adjacent pocket. This relation is produced by a slope 56 in the top of the screw head from the wall 54 to the wall 55. Since all pockets are alike, each pocket has a high wall 54 and a low wall 55. The slope 56 makes an angle on the order of 15° or 20° to the horizontal.

The edges of the pockets are formed with a convex chamfer 57 to aid in leading the driver into the socket. A fast spinning driver will enter the socket almost instantly after being brought below the upper end of the walls 54. On its first rotation it will strike against the walls 54 and commence to turn the screw. As the driver is progressively depressed, it enters farther into the socket.

The outer end walls 58 converge toward a relatively flat or slightly dished bottom 59, as may be seen in Figure 12. Also, as shown in the same figure, the side walls 60, although converging outwardly, are equidistant along a plane transverse of the slot and substantially perpendicular to a radius of the screw head.

Since the pockets 53 do not extend out to the edge of the head 51, there remains a flat annulus 61 between the edge of the head and the outer ends of the pockets. The annulus is in the plane of the upper ends of the walls 54 and is unaffected by the sloping surfaces 56. A screw driver slot 62 of conventional shape and dimensions, is formed diametrically across the top of the head and preferably in line with two opposed pockets 53, extending also across the annulus 61 and having uniformly deep sections therein.

A further refinement of the sloping surfaces is shown in Figures 14, 15 and 16, which illustrate a machine screw 70 having a conical head 71. As in the previous construction, the socket comprises an axial recess 72 and a number of pockets 73 extending radially outward therefrom. In a sense each pocket has a high wall 74 and a low wall 75, the walls 74 and 75 being respectively on corresponding sides of the pockets with respect to either direction of rotation around the axis of the screw. Consequently there is formed a slope 76 from the high wall of one pocket to the low wall of the next pocket as shown in Figure 16. The higher edge of each slope 76 is carried beyond the outer end wall 77 of the corresponding pocket to the margin of the head 71, as indicated by the extended line 78. Each slope therefore covers the entire surface of the head between the two adjacent pockets, or between two adjacent high walls 74 and their extensions 78, bounded by the intervening arc of the head circumference and the top of the intervening pocket 73.

To this extent the sloping surfaces 76 are inclined in the circumferential direction. There is also a convex depression or declination 79 radially inward from the circumference of the head. The edges of the pockets are chamfered convexly as indicated by the numeral 80. The end walls 77 slope toward the bottom 81 while the lateral walls 74 and 75 are equidistant along any given plane parallel to the screw axis, as shown in Figure 15, although converging radially inward. In the top of the head is formed a screwdriver slot 82 whose bottom slopes generally downward toward the screw axis, as above set forth.

The properties of this screw in operation embody those described in connection with Figures 11, 12 and 13. Moreover, the sloping surfaces 79 aid in further directing the driver toward the center of the socket and in matching relation thereto.

In each of the embodiments disclosed herein, the slope of the pocket walls downwardly and toward the axis of the screw aids in expelling the driver after the screw has been driven tight. The tendency of the driver to rotate against the sloping walls of the tightened and fixed screw causes the driver to ride upward on these walls and out of the screw.

In Figures 11, 12, 13, 14, 15 and 16 the slope of the end walls of the pockets is somewhat exaggerated for most sizes of screws. This angle will, in most cases, be smaller than shown, but it may be somewhat greater in some cases, according to the size of the screw. Similarly, the convex surfaces on the heads of certain of the screws illustrated herein are slightly exaggerated. The radius of the convex surface, in any case, will depend on the size of the screw. In this connection, the chamfer at the entrance of the socket is also convex and blends with the convex top of the screw where such a surface is provided, so that the convex top merges with the walls of the socket. The chamfer also blends with the walls of the socket and with the walls of the diametrical screwdriver slot, where such is provided.

Thus, no corner or seat is formed anywhere between the convex surface and the driver socket. A concave depression in the screw head, as well as a sharp corner, is likely to seat an uncentered driver long enough to permit the driver to cut and ruin the screw head. Such seating of the driver is not possible with the convex-walled depressions of this invention, since a convex wall leads an uncentered driver either to the center of the screw or radially off the screw head.

With further reference to the style of socket shown in Figures 5 and 6, a screw with such a socket is suitable particularly in a corner where it cannot be reached by a power screwdriver and must be tightened by hand. The numerous radial pockets aid in effectively driving the screw by hand.

The manual screwdriver slots 8 in Figure 1 and the slots 16 in Figure 3 are longer than the maximum diametrical extent of the corresponding sockets. It will be noted also that these slots have concave bottoms. A conventional screwdriver fitted in one of the elongated slots has a high-driving leverage on the screw to compensate for the more numerous but shorter driving vanes of the power driver. A conventional square-end driver is readily fitted to the concave bottom of the slot merely by having the corners rounded off by grinding. The avoidance of short corners in the slot and in the driver eliminates breaking and chipping of the driver and screw, as already set forth.

It will be understood that the various styles of sockets are not limited to the specific types of screws in which they are shown. Any shape of socket may be employed in any style of screw as desired or required. Moreover, any particular socket may be modified to embody features of another socket, within the terms and scope of the invention.

Although specific embodiments have been illustrated and described, it will be understood that various alterations in the details of construction may be made without departing from the scope of the invention indicated by the intended claims.

What I claim is:

1. A socket head screw having a depression in the top of its head and continuous about the axis of the screw and a driver socket extending into the screw from the bottom of said depression and symmetrical with said axis, the wall of said depression being convex on the top of the screw, said wall merging into the walls of said socket and being extended radially outward beyond the outermost walls of said socket and substantially to the edge of said top.

2. A socket head screw having a depression in the top of its head and symmetrical about the axis of the screw and a driver socket extending into the screw from the bottom of said depression and symmetrical with said axis, said socket comprising a central recess and a series of radial pockets, the wall of said depression being convex on the top of the screw, said wall merging into the walls of said socket and being extended radially outward beyond the outermost wall of said socket and substantially to the edge of said top.

3. A socket head screw having a depression in the top of its head and continuous about the axis of the screw and a driver socket extending into the screw from the bottom of said depression and symmetrical with said axis, said socket comprising a central recess and a series of radial pockets, each pocket having a substantial circumferential extent in relation to its radial extent, whereby to receive a relatively thick-vaned driver, the wall of said depression being convex on the top of the screw, said wall merging into the walls of said socket and being extended radially outward beyond the outermost walls of said socket and substantially to the edge of said top.

4. A socket head screw having a depression in the top of its head and continuous about the axis of the screw and a driver socket extending into the screw from the bottom of said depression and symmetrical with said axis, the wall of said depression being convex on the top of the screw, said wall merging into the walls of said socket and being extended radially outward beyond the outermost walls of said socket and substantially to the edge of said top, said head being formed with a transverse slot in the bottom of said depression, the bottom of said slot having an upward slope at both ends toward the periphery of said head, whereby to maintain a substantial depth from the convex bottom of said depression.

5. A socket head screw having a depression in the top of its head and continuous about the axis of the screw and a driver socket extending into the screw from the bottom of said depression and symmetrical with said axis, the wall of said depression being convex on the top of the screw, said wall merging into the walls of said socket and being extended radially outward beyond the outermost walls of said socket and substantially to the edge of said top, said head being formed with a transverse slot in the bottom of said depression, the bottom of said slot being concave from end to end, whereby to maintain a substantial depth from the convex bottom of said depression.

6. A socket head screw having a depression in the top of its head and continuous about the axis of the screw and a driver socket extending into the screw from the bottom of said depression and symmetrical with said axis, the wall of said depression being convex on the top of the screw, said wall merging into the walls of said socket and being extended radially outward beyond the outermost walls of said socket and substantially to the edge of said top, said head being formed with a transverse slot in the bottom of said depression and having its ends spaced from the lateral wall of said head, the bottom of said slot having an upward slope at both ends toward the periphery of said head, whereby to maintain a substantial depth from the convex bottom of said depression.

7. A socket head screw having a depression in the top of its head and continuous about the axis of the screw and a driver socket extending into the screw from the bottom of said depression and symmetrical with said axis, the wall of said depression being convex on the top of the screw, said wall merging into the walls of said socket and being extended radially outward beyond the outermost walls of said socket and substantially to the edge of said top, said head being formed with a transverse slot in the bottom of said depression and having its ends spaced from the lateral wall of said head, the bottom of said slot being concave from end to end, whereby to maintain a substantial depth from the convex bottom of said depression.

8. A socket head screw having a depression in the top of its head and continuous about the axis of the screw and having a driver socket comprising a recess extending from the bottom of said depression axially along said screw and a series of pockets extending radially from said recess, the wall of said depression being convex on the top of the screw, said wall merging into the walls of said recess and pockets and being extended outwardly substantially to the edge of said top, each pocket having a high wall and a low wall terminating at the bottom of said depression, said bottom also sloping downwardly and circumferentially from each high wall to the low wall of the adjacent pocket.

DOMNIC V. STELLIN.

REFERENCES CITED

The following references are of record in the file of this patent:

UNITED STATES PATENTS

| Number | Name | Date |
| --- | --- | --- |
| 131,843 | Brooks | Oct. 1, 1872 |
| 975,285 | Robertson | Nov. 8, 1910 |
| 1,814,966 | Rosenberg | July 14, 1931 |
| 1,910,182 | Robertson | May 23, 1933 |
| 2,142,185 | Fieg | Jan. 3, 1939 |
| 2,173,707 | Brown | Sept. 19, 1939 |
| 2,268,515 | Olson | Dec. 30, 1941 |
| 2,285,461 | Purtell | June 19, 1942 |
| 2,322,509 | De Vellier | June 22, 1943 |

FOREIGN PATENTS

| Number | Country | Date |
| --- | --- | --- |
| 158,599 | Germany | Feb. 22, 1905 |